United States Patent

Baltz

[15] 3,699,661
[45] Oct. 24, 1972

[54] LIQUID LEVEL DEVICE

[72] Inventor: George W. Baltz, Route 4, Pocahontas, Ark. 72455

[22] Filed: July 13, 1970

[21] Appl. No.: 54,314

Related U.S. Application Data

[63] Continuation-in-part of Ser. No. 877,404, Nov. 17, 1969.

[52] U.S. Cl. ................................................33/377
[51] Int. Cl. ...............................................G01c 9/20
[58] Field of Search.....33/209, 212, 213, 214, 750 S, 33/211, 70 F, 70 B, 210

[56] References Cited

UNITED STATES PATENTS

| 2,541,215 | 3/1951 | Davis | 33/212 |
| 936,407 | 10/1909 | Bunting | 33/209 |
| 1,576,470 | 3/1926 | Richardson | 33/209 |
| 2,180,509 | 11/1939 | Dickson | 33/213 |
| 3,460,261 | 8/1969 | Frey | 33/75 R |
| 1,622,752 | 3/1927 | Yakesh | 33/212 |

FOREIGN PATENTS OR APPLICATIONS

| 183,242 | 7/1922 | Great Britain | 33/206 |
| 157,078 | 0/1932 | Switzerland | 33/214 |

*Primary Examiner*—Leonard Forman
*Assistant Examiner*—Charles E. Phillips
*Attorney*—Hill, Sherman, Meroni, Gross & Simpson

[57] ABSTRACT

The disclosure includes a liquid level device comprising a circular tube made of clear plastic and partially filled with colored water. The tube is mounted on a protractor for measuring angles relative to the horizontal.

3 Claims, 5 Drawing Figures

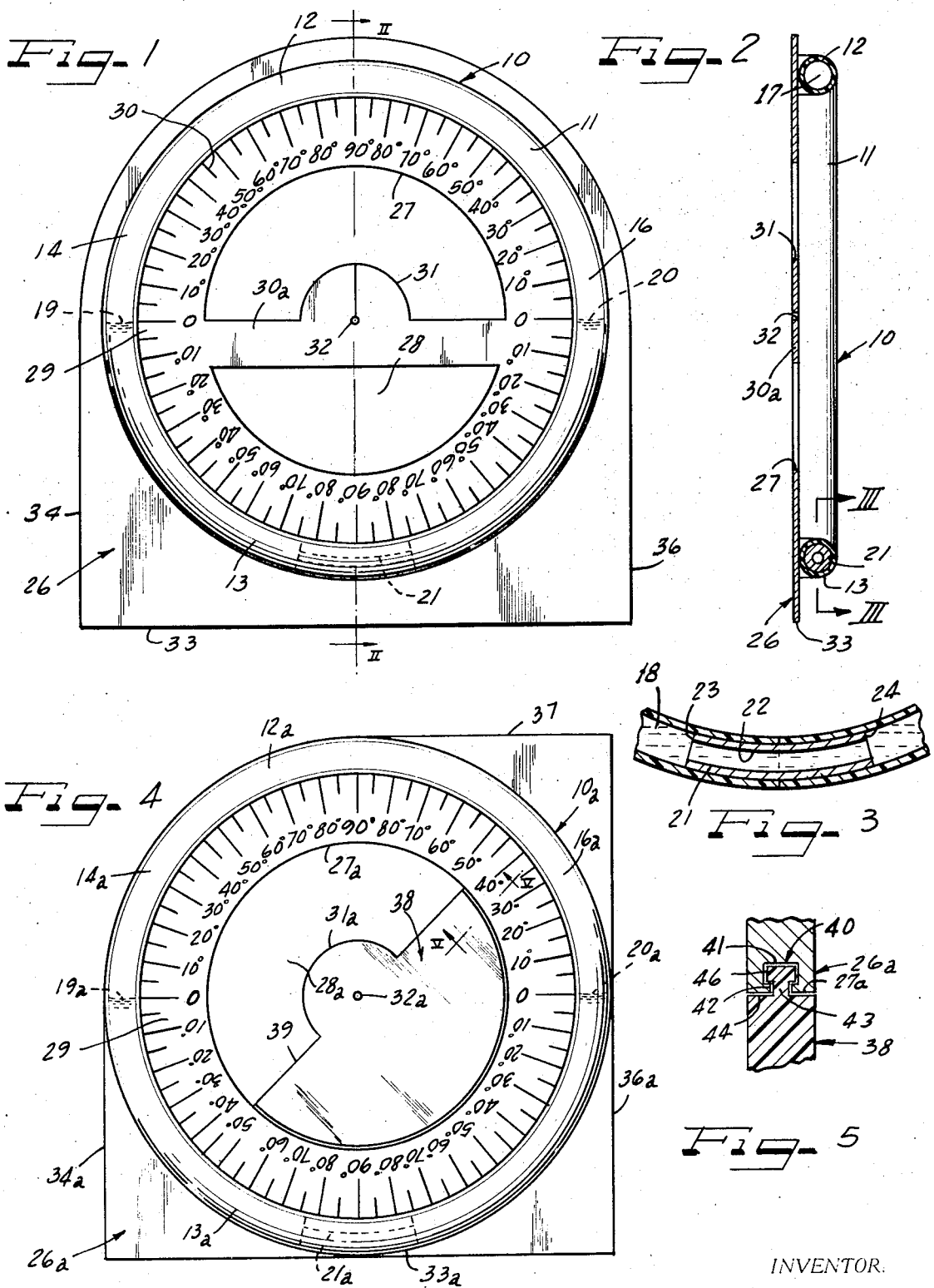

LIQUID LEVEL DEVICE

CROSS-REFERENCES TO RELATED APPLICATIONS:

This application is a continuation-in-part of my copending application Ser. No. 877,404 entitled "Liquid Level Device" filed Nov. 17, 1969.

BACKGROUND OF THE INVENTION

This invention relates to the field of liquid levels.

Most liquid levels of which I am aware comprise essentially a glass tube nearly filled with alcohol, ether or the like and enclosing a movable bubble which when centered indicates the tangent to the tube at the point or the line of sight to be truly horizontal.

Such known levels have wide utility. For example, they are often used in building construction for determining plumb lines and are also employed in transit theodolites used in surveying.

The use of bubble type levels is limited, however, to those applications and to those kinds of instruments in which the location of the bubble itself is readily ascertainable. Furthermore it is often difficult to accurately read a bubble type level due to the minuscule size of the bubble and of the center markings on the glass tube.

The present invention provides for increased application of liquid levels, is easier to use in many instances than prior levels and provides an interesting and educational tool for children, all of which are objects of the invention. In addition, it is inexpensive to manufacture and fairly immune from inadvertent breakage.

The invention may be summarized as comprising a circular, clear, closed, hollow tube which is half filled with liquid. A protractor is mounted thereon so that the level may be utilized in the manner of a transit theodolite.

The tube may be made of inexpensive plastic to virtually preclude breakage. An apertured plug may be inserted in the tube to provide a restricted orifice for the liquid passing therethrough as it seeks a common level. The orifice almost entirely eliminates oscillation of the liquid so that the two meniscuses are in position to be read as soon as the level is brought to a vertical position.

Other objects, features and advantages of the invention will be readily apparent from the following description of preferred embodiments thereof, taken in conjunction with the accompanying drawing, although variations and modifications may be effected without departing from the spirit and scope of the novel concepts of the disclosure.

BRIEF DESCRIPTION OF THE DRAWING

FIG. 1 is an elevational view of a liquid level constructed in accordance with the principles of the present invention mounted on a protractor.

FIG. 2 is a vertical cross-sectional view taken along lines II—II of FIG. 1.

FIG. 3 is a cross-sectional view of the apertured plug press-fitted in the liquid level tube taken along lines III—III of FIG. 2.

FIG. 4 is an elevational view of another embodiment of a protractor-mounted liquid level constructed in accordance with the principles of the present invention.

FIG. 5 is an enlarged sectional view of a portion of the structure shown in FIG. 4 taken substantially along lines V—V of FIG. 4.

DESCRIPTION OF THE PREFERRED EMBODIMENT

Referring to the drawing, a liquid level constructed in accordance with the principles of the present invention is indicated generally at reference numeral 10 in FIGS. 1–3. The device 10 may be more particularly characterized as comprising an endless hollow tube 11 which includes upper and lower segments or portions 12 and 13 and vertical legs or side portions 14 and 16 which interconnect the upper and lower portions 12 and 13. The side portions 14 and 16 may be considered to be two separate spaced vertical columns which are interconnected at their top ends through the upper portion 12 and at their bottom ends by virtue of the bottom portion 13.

The hollow of the tube 11, indicated at reference numeral 17, is partially filled with liquid 18 which rises in the side portions 14 and 16 to a common level when the essentially planar tube 11 is raised to a vertical position. The meniscuses indicated at reference numerals 19 and 20 formed respectively at the upper ends of the liquid columns in the side portions 14 and 16 reside together in a truly horizontal line.

The tube 11 is circularly shaped and made of clear plastic not only to facilitate visual observation of the meniscuses 19 and 20 but also to reduce the likelihood of inadvertent breakage of the level 10. The liquid, unlike that used in most spirit or bubble-type levels, may simply be water. The water may be colored to additionally facilitate ready eye alignment of the meniscuses 19 and 20.

A plug 21 is press-fitted into the bottom portion 13 of the tube 11. The plug 21 is generally cylindrically shaped but conforms to the curvature of the tube 11. An axial passageway 22 extends from one end 23 of the plug 21 to an opposite end 24 to provide a restricted orifice through which the liquid 18 flows as it seeks its own level in the two columns 14 and 16. In the illustrated embodiment the free cross-sectional area of the passage 22 is approximately one-half of the tube 11. I have found that this relationship provides a good dampening effect in a level in which the tube 11 is a circle of approximately 12 inches in diameter and wherein the cross-sectional diameter of the tube itself is approximately five-eighths inch.

For example, I have observed that a liquid level 10 constructed to substantially the above dimensions provides a very rapid reading with almost no discernible oscillation of the meniscuses 19 and 20 as long as the plug 21 resides in the lower portion 13 so that the liquid 18 flows through it in seeking its level. On the other hand without the plug 21 the meniscuses 19 and 20 oscillate quite noticeably and generally require five to fifteen seconds to become stabilized after the tube 11 has been brought to a vertical position.

In the embodiment shown in FIGS. 1 and 2 the tube 11 is mounted on a flat sheet- form plate member 26 having an inner circular edge 27 forming an opening 28 centrally thereof. The circular tube 11 is concentrically disposed and of an increased diameter with respect to the opening 28 such that an annular portion 29 of the plate member 26 is disposed radially inwardly of the circular tube 11. Protractor indicia as designated at reference numeral 30 is formed on the annular portion 29 and may be divided in four 90° quadrants as shown in FIG. 1.

A transverse arm 30a of the plate member 26 extends across the opening 28 in slightly offset relation to the center of opening 28 and comprises an embossment or projection 31 which surrounds the center of the opening 28, at which center an aperture 32 is formed.

The liquid 18 half-fills the tube 11. Consequently when the device 10 is brought into a vertical position the liquid 18 extends around the tube 180° between the meniscuses 19 and 20.

The level 10 may be utilized in a variety of applications. For example, when it is mounted on a protractor 26 having one side 33 thereof squared and in parallel alignment with the 0°–90°–180° line of the protractor the invention may be utilized for ascertaining a plumb line. Because of the increased size in which the tube 11 may easily be made the readings with respect to plumb are generally more accurate than those available from the usual spirit level. In addition, the invention is more easily handled and is more convenient to use in work such as carpentry than the conventional spirit level. Further, it can tolerate mishandling to a greater extent than the conventional spirit level without being subject to damage.

Another manner in which I have utilized the present invention is for determining the water level or shore line of a fish or stock pond. By merely standing so that eye level is at the proposed level of the stock pond the liquid level 10 can be held to the eye and moved in transit across the ground surface to be covered by the stock pond, and along the line in which the meniscuses 19 and 20 extend to the ground surface, the water level or shore line of the stock pond will run.

Another method is available for more accurately determining the shore line. This method utilizes two stakes. The first is set in the ground so that the top or an otherwise marked portion thereof is at eye level. The liquid level device 10 is mounted at eye level on the top of the other stake. With the second stake the surveyor moves along the ground surface and at intervals places the second stake on the ground and sights back along a line coincident with the meniscuses 19 and 20 to the top of the first stake. Whenever the sighted line coincides with the top of the first stake, the second stake is then positioned on the ground at a point on the proposed stock pond shore line.

The above method requires only one person rather than the two persons (including a rod man) that would generally be required to perform the same job using a conventional transit theodolite. While the survey may often not be as accurate as it would be using a theodolite (because of the magnification properties of the more expensive instrument) it will be quite satisfactory in most instances.

The liquid level device 10 may also be used as an educational tool. For example, Boy Scouts can be taught to ascertain the height of an object such as a flag pole by using the protractor-equipped level as illustrated in FIGS. 1 and 2.

For example, to determine the height of a flag pole the user stands adjacent the pole and makes a mark at eye level. Then he steps off a distance along the ground from the base of the pole, sighting back to the eye level mark on the pole, until the top of the pole is aligned with the 45° mark on the protractor scale while the meniscuses 19 and 20 are aligned with the eye level mark on the pole. The distance from the eye level mark on the pole to the top of the pole is equal to the distance stepped off from the base of the pole to the point at which the top of the pole is aligned with the 45° mark on the protractor scale. By adding to that distance the distance from the base of the pole to the eye level mark the overall height of the flag pole may be easily calculated. Many other interesting and educational exercises can be performed with the liquid level device 10 and the imagination and resourcefulness of youngsters can lead to countless additional exercises.

As a result of the plastic construction of the tube 11 the device 10 is virtually immune from damage. Furthermore it may be manufactured so economically as to substantially increase the applications of liquid levels in every day use.

The aperture 32 is used for centering purposes. For example, a pencil point may be inserted therethrough so that the protractor 26 may be used in the manner of a conventional protractor. The transverse arm 30a is slightly offset from the center of the protractor opening 28 to reduce interference when sighting along the 0°– 0° markings on the protractor indicia.

The tube 11 may be affixed to the protractor 26 in any suitable manner. In applications which make it desirable to be able to remove the tube 11 from the protractor 26, releasable clamps may be used. On the other hand adhesive cement or the like may be used when it is desired to make the tube-protractor assembly a permanently fixed assembly.

In addition to bottom side 33 of the protractor plate member 26, there is also included a pair of spaced, parallel, partially flat sides 34 and 36 extending at right angles to side 33 for ascertaining the plumb of a vertical member.

In the embodiment of the invention shown in FIGS. 4 and 5, in which parts similar to those shown in FIGS. 1–3 are given similar reference numerals with the suffix a added, the protractor plate member 26a comprises four flat or partially flat sides 33a, 34a, 36a and 37. These four flat sides, arranged at right angles to one another, provide increased utility and flexibility in use of the level 10a.

The opening 28a is half-filled with a semi-circular plate portion 38 which comprises a flat edge 39 extending through the center of the protractor 26a. A protuberance 31a projects from the flat edge 39 and is apertured at 32a in the center of opening 28a for the same reason set forth above in connection with the embodiment shown in FIGS. 1–3.

In FIG. 4 the flat edge 39 is indicated as extending at an angle of 45° with respect to the bottom side 33a and to the other sides 34a, 36a and 37 as well. A 45° measurement is, of course, widely used in many protractor applications and ease in ascertaining such measurement is particularly fitting in connection with the present invention.

Other angles are also commonly measured, however, particularly 30° and 60°. In order that these angles may also be quickly and easily measured from horizontal or vertical, or any angle between 0° and 90° for that matter, the plate portion 38 may be separate and distinct from the plate member 26a and in fact movable relative thereto.

Referring to FIG. 5, the inner circular edge 27a of the plate member 26a is continuous about the center of opening 28a and is constructed and arranged so as to receive the flat sheet-form plate portion 38 in snap-in assembly to permit the portion 38 to be rotated within opening 28a.

To that end the edge 27a is recessed as at 40 in a manner so as to provide in cross-section an enlarged female groove 41 opening to edge 27a through a reduced neck portion 42. The plate portion 38 is similarly constructed to provide a narrow protuberance 43 projecting from an outer wall 44 and having a male rib 46 formed at the distal end thereof and received in the female groove 41. The plate portion 38, or at least the protuberance 43 and the male rib 46, may be conveniently formed of plastic or similar resilient material for quick snap-in assembly of the male rib 46 in the female groove 41.

Since the inner plate portion 38 is thus rotatable in protractor plate member 26a any angle between 0° and 90° from horizontal or vertical plumb may be easily ascertained. Since the male rib 46 is made of plastic there is a sufficient frictional resistance to movement of the inner portion 38 to prevent unwanted rotational slippage therebetween. Nevertheless only slight finger-gripping rotation is required to rotate the inner portion 38 relative to the plate member 26a.

Again it is anticipated that the principles of the present invention lend themselves to inexpensive devices which may be used by younger and less experienced persons for a variety of applications and as an educational tool. The structure lends itself particularly well to immunity from inadvertent damage. It will be appreciated, however, that the invention can also be advantageously utilized by professional persons in the usual applications.

I claim as my invention:

1. A liquid level device comprising
   a tube forming a planar, closed, hollow, circular loop,
   a quantity of liquid half-filling said loop,
   a flat protractor plate member,
   means mounting said tube stationarily on said plate member,
   means forming a circular edge in said plate member forming an opening concentric to the confines of said tube and means providing on said plate member between said tube and said circular edge an annular protractor indicia bearing portion,
   a semi-circular plate within said opening, having an outer wall shaped complementarily to and immediately adjacent said circular edge,
   means forming cooperating interlocking members including a male rib and a female groove on said outer wall and said circular edge for relatively rotatably mounting said semi-circular plate on said plate member.

2. The invention as defined in claim 1 wherein said plate member comprises three sides at least portions of which are flat and arranged at right angles to one another.

3. The invention as defined in claim 1 wherein at least one of said interlocking members is formed of plastic to provide easy snap-in assembly of said semi-circular plate and said plate member.

* * * * *